United States Patent
Hinn et al.

(10) Patent No.: US 11,125,600 B2
(45) Date of Patent: Sep. 21, 2021

(54) METHOD AND DEVICE FOR DETECTING A FLUID CONTACTING

(71) Applicant: TECAN TRADING AG, Mannedorf (CH)

(72) Inventors: Werner Hinn, Stafa (CH); Lars Kamm, Schanis (CH); David Kress, Uster (CH)

(73) Assignee: TECAN TRADING AG, Mannedorf (CH)

( * ) Notice: Subject to any disclaimer, the term of this patent is extended or adjusted under 35 U.S.C. 154(b) by 336 days.

(21) Appl. No.: 15/768,711

(22) PCT Filed: Sep. 22, 2016

(86) PCT No.: PCT/EP2016/072561
§ 371 (c)(1),
(2) Date: Apr. 16, 2018

(87) PCT Pub. No.: WO2017/067734
PCT Pub. Date: Apr. 27, 2017

(65) Prior Publication Data
US 2018/0313683 A1    Nov. 1, 2018

(30) Foreign Application Priority Data

Oct. 20, 2015  (CH) ..................... 01526/15

(51) Int. Cl.
*G01F 23/26* (2006.01)
*G01N 35/10* (2006.01)

(52) U.S. Cl.
CPC ............ *G01F 23/266* (2013.01); *G01F 23/26* (2013.01); *G01N 35/1009* (2013.01); *G01N 2035/1025* (2013.01)

(58) Field of Classification Search
CPC ... G01F 23/266; G01F 23/26; G01N 35/1009; G01N 2035/1025
See application file for complete search history.

(56) References Cited

U.S. PATENT DOCUMENTS 4,485,673 A * 12/1984 Stern ..................... G01F 23/266
340/870.16
2014/0123774 A1   5/2014 Tanoue et al.

FOREIGN PATENT DOCUMENTS

CH         01129/14         7/2014
DE     102010049488 A1      5/2011
(Continued)

OTHER PUBLICATIONS

International search report for corresponding PCT application No. PCT/EP2016/072561, dated Jan. 5, 2017.
(Continued)

*Primary Examiner* — Manuel L Barbee
(74) *Attorney, Agent, or Firm* — Notaro, Michalos & Zaccaria P.C.

(57) ABSTRACT

The invention relates to a device (100) having multiple capacitively working channels, wherein the device (100) comprises a advancable sensor (3.1, 3.2) and a fluid container per channel. The device (100) also comprises a generator (G) for providing a periodic input signal ($s_{in}(t)$). In addition, the device (100) comprises one compensation circuit (CT.1, CT.2) per channel, which can be supplied with the periodic input signal ($S_{in}(t)$) and which is designed to provide an input signal ($S_{in1}(t)$, $S_{in2}(t)$) at a first output (A.1, A.2) for applying to the sensor (3.1, 3.2) of the channel, wherein the compensation circuit (CT.1, CT.2) comprises a further output (6.1, 6.2) which is designed to provide a signal ($s_1(t)$, $s_2(t)$) that can be evaluated to detect a phase boundary.

7 Claims, 6 Drawing Sheets

(56) References Cited

FOREIGN PATENT DOCUMENTS

EP 2741087 A1 * 6/2014 ........... G01F 23/268
EP 2741087 A1   6/2014

OTHER PUBLICATIONS

Office action in corresponding German application No. DE 11 216 004 791.6, dated Apr. 15, 2020.

* cited by examiner

METHOD AND DEVICE FOR DETECTING A FLUID CONTACTING

The invention relates to a method and a device for detecting a liquid contacting of a sensor with a liquid in a liquid container.

BACKGROUND OF THE INVENTION

There are numerous laboratory systems and medical as well as pharmaceutical devices which require precise pipetting operations to obtain satisfactory analytical accuracy. For this, the fill level in test tubes, titer plates and other liquid containers must be precisely determined. There are also applications involving the detection of foam-liquid phase boundaries. In the following, the term phase boundary is used both for transitions between gaseous and liquid media (gas-liquid phase boundary) and for transitions between different liquid media (foam-liquid phase boundary).

Particularly when the automation of measurement or experimental procedures is concerned, such a determination of the phase boundary is of importance. The so-called fill level detection is typically carried out by means of a detection of the liquid level, i.e. the position of the phase boundary between air and liquid is determined. This process is also known as Liquid Level Detection (LLD).

In the prior art, various methods for fill level detection are known based on different physical principles, such as the detection of the light reflected from the surface of the liquid, or the measurement of electrical properties of the pipettes when they are brought into contact with the liquid. Since a gas and a liquid have distinctly different dielectric constants, the gas-liquid phase boundary can also be determined via a change in capacitance.

Liquid level detection is used, for example, in pipetting devices. Here, when aspirating with a pipette, the pipetting needle should be immersed as little as possible in the liquid to be pipetted, in order to minimize contamination of the outside with sample liquid. When aspirating, the pipetting needle is therefore typically immersed only a few millimeters below the liquid level. However, it must be ensured that the pipetting needle is sufficiently immersed so that no air can be aspirated. During the suction process, the pipetting needle then continuously follows the sinking liquid level, so that it always remains at the same depth in relation to the liquid level. After the aspiration, it is possible to calculate based on the volume aspirated and the cross-sectional area of the liquid container, at what level the gas-liquid phase boundary should be. As the pipette tip emerges, an emersion signal can be compared to the calculated position of the gas-liquid phase boundary to verify the pipetting process.

On the one hand, it is therefore desirable to position the pipetting tip just below the liquid surface. On the other hand, the filling level can vary greatly from one liquid container to another, which is why the pipetting tip has to be precisely positionable. For this purpose it is extremely important to be able to detect the liquid surface properly.

FIG. 1 shows a schematic illustration of a capacitive detection method in a device with an advancable sensor 3 and with a liquid container 5, which is filled with liquid 1. Based on this illustration, details of an exemplary detection method will be explained, which determines the position of the air-liquid phase boundary in a capacitive way. In order to carry out such a liquid level detection, the advancable sensor 3 is supplied with an input signal $s_{in}(t)$. The input signal $s_{in}(t)$ is provided here by an input signal generator E.

The advancable sensor 3 is shown in three different positions a), b) and c). With B, the advancing movement is designated. In position a), the sensor 3 is located far above the liquid 1. In position b), it has approached the liquid 1. A situation shortly after touching the liquid 1 is indicated by c). Upon reaching the position c), this results in a capacitance jump on the sensor 3, which can be evaluated by the measuring device M. For this purpose, the measuring device M processes the output signal $s_{out}(t)$.

However, the reliability of detecting the liquid surface with the known methods is not satisfactory in some cases. This concerns in particular devices in which several liquid containers with the respective sensors are arranged side by side, since it can lead to crosstalk or other mutual interference here. Crosstalk between adjacent measurement channels can reduce the signal-to-noise ratio in the respective adjacent channels, which can lead to a limitation of the sensitivity in the detection of a liquid contacting.

FIG. 2A shows a corresponding schematic illustration of a multi-channel device (here two adjacent channels are shown), each with an individually advancable sensor 3.1 or 3.2 and with a respective liquid container 5.1 or 5.2, which is filled with the liquid 1.1 or 1.2. The wiring of the device corresponds to the wiring of FIG. 1. Each channel has its own input signal generator E.1 or E.2 and a separate measuring device M.1 or M.2. The first sensor 3.1 of the first channel is fed by the input signal generator E.1 with a first input signal $s_{in1}(t)$t and the second sensor 3.2 of the second channel is fed by the input signal generator E.2 with a second input signal $s_{in2}(t)$. The first measuring device M.1 of the first channel evaluates the first output signal $s_{out1}(t)$. Accordingly, the second measuring device M.2 of the second channel evaluates the second output signal $s_{out2}(t)$. The fact that it can come to crosstalk between these two channels is symbolized in FIG. 2A by a crosstalk capacitor Cx, which is arranged here in a purely schematic form between the measuring devices M.1 and M.2.

FIG. 2B shows a corresponding schematic illustration of another multi-channel device (two adjacent channels are shown here). This device is based on the principle shown in FIG. 1. Unlike in FIG. 2A, however, both channels are fed by only one input signal generator E with the input signal $s_{in}(t)$.

FIG. 2C shows a schematic equivalent circuit diagram of the device of FIG. 2B. Here, an alternating voltage generator G serves as an input signal generator E, which feeds both channels with the input signal $s_{in}(t)$. Alternating voltage generator G generates here a sinusoidal input signal $s_{in}(t)$, which reaches the first sensor 3.1 via a first resistor R.1 and the second sensor 3.2 via a second resistor R.2. In this highly schematic equivalent circuit, these sensors 3.1, 3.2 each have a capacitor C.1 or C.2 against mass. The output signal $s_{out1}(t)$ of the first channel can, as shown schematically, be tapped at the first sensor 3.1. The output signal $s_{out2}(t)$ of the second channel is tapped accordingly at the second sensor 3.2. The respective measuring devices M.1 and M.2 are provided here, as shown in FIG. 2B, which are used to process the signals $s_{out1}(t)$ or $s_{out2}(t)$.

In FIG. 2C, to the left of the first channel, a circuit branch is shown having a switch SW and a capacitor CΔ. This circuit branch is intended to symbolize what happens when the first sensor 3.1 touches the liquid 1.1 in the container 5.1. At this moment, there is a sudden change in the total capacitance (the total capacitance at the sensor 3.1 becomes bigger). This is represented here by the connection of the parallel capacitor CΔ. The already mentioned crosstalk is also shown in FIG. 2C by the crosstalk capacitor Cx.

The capacitor C.1 forms a first voltage divider with the resistor R.1 and the capacitor C.2 forms a second voltage divider with the resistor R.2. At these two voltage dividers, the respective output voltages $s_{out1}(t)$ or $s_{out2}(t)$ can be tapped. When immersing the first sensor 3.1 in liquid 1.1, which is shown here by the connection of the parallel capacitor C∆ by closing the switch SW, there is a sudden change in the output voltage $s_{out1}(t)$. Because of the crosstalk (here because of the crosstalk capacitor Cx), this also results in a small jump in the output voltage $s_{out2}(t)$, which can, for example, trigger a misdetection in the circuit M.2.

The crosstalk can not only affect the achievable detection accuracy, but it may even lead to misdetections under certain circumstances.

Therefore, it is important to provide devices and methods that prevent or reduce crosstalk and that are designed to prevent mutual interference.

OBJECT OF THE INVENTION

It is therefore the object of the invention to provide a method for detecting liquid contacts of a plurality of movable sensors, which enables secure detection of the corresponding phase boundaries at all times.

Another object of the invention is to provide corresponding devices.

DISCLOSURE OF THE INVENTION

The above-identified technical object of the invention is achieved by a method which is designed for use in a multi-channel device with a capacitively operating measuring device, wherein the device comprises an advancable sensor and a liquid container per channel. The method comprises the following steps:
a) Performing a feed movement with a first one of the sensors;
b) Performing a feed movement with a second one of the sensors, wherein these feed movements may be coupled or independent of each other;
c) Applying a first input signal to the first sensor;
d) Applying a second input signal to the second sensor; wherein the first input signal and the second input signal are kept synchronous and constant so as to prevent the occurrence of a voltage difference between the first sensor and the second sensor or to reduce the voltage difference.

By preventing or reducing the voltage difference between adjacent sensors of a multi-channel device, crosstalk is prevented or reduced.

The technical problem of the invention is also solved by a device the features of which can be found in the corresponding claims.

Further advantageous features can be found in the dependent claims.

BENEFICIAL EFFECTS

The most important advantage of the invention is that no crosstalk or only a slight crosstalk can occur between two channels of a multi-channel device. This advantageously makes it possible to detect even low-conductivity liquids or small liquid volumes.

With the invention, it is also possible in a liquid container, which is associated with a first channel, to detect the air-liquid phase boundary of a low-conductivity liquid and in a liquid container of an adjacent second channel to detect the air-liquid phase boundary of a small liquid volume with high conductivity.

It is a further advantage of the new approach presented here that it can also be easily combined with a method for detecting an air-foam or a liquid-foam boundary. Preferably, the method of the present invention is combined with a method disclosed in the Swiss Patent Application 01129/14 filed on Jul. 24, 2014.

BRIEF DESCRIPTION OF THE DRAWINGS

The method according to the invention will now be explained in detail with reference to exemplary embodiments shown in the drawings which do not limit the scope of the invention.

DETAILED DESCRIPTION OF THE PREFERRED EMBODIMENTS

Figure 1:
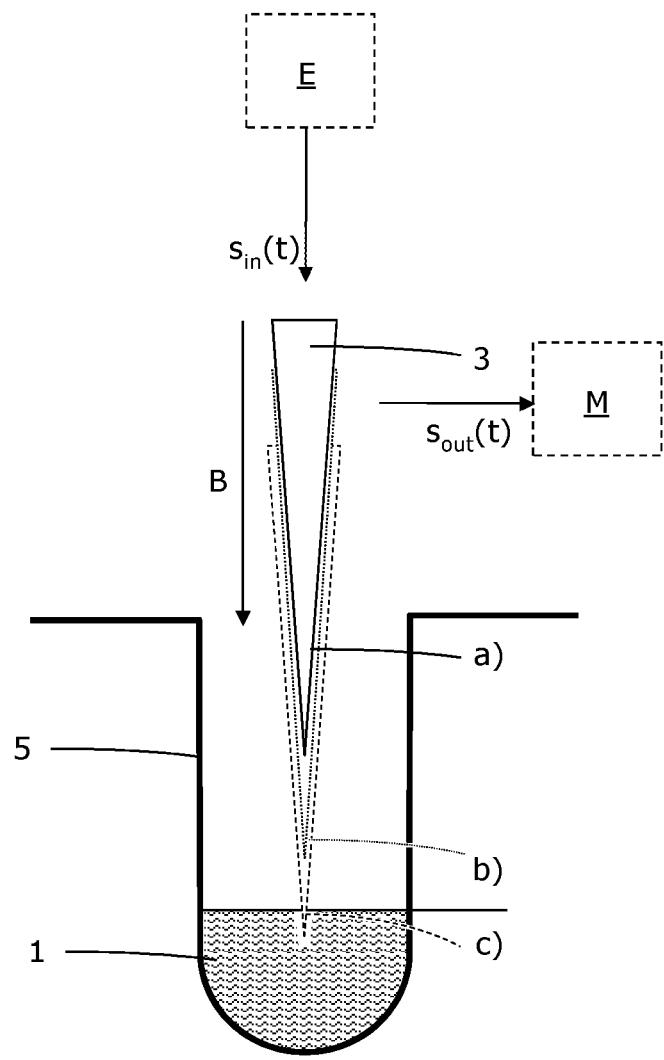
FIG. 1 shows a schematic illustration of a known capacitively operating detection method in a device with an advancable sensor and with a liquid container which is filled with liquid.

In the following, advantageous embodiments of the invention are described, which are exemplary embodiments. These include both various embodiments of the overall invention, as well as assemblies and individual parts of the invention. In principle, the described assemblies and individual parts of the various embodiments can be combined with one another, or the assemblies and individual parts of individual embodiments can be replaced by the assemblies and individual parts of other embodiments. The combinations formed in this case can cause smaller adjustments which are familiar to any person skilled in the art and are therefore not further described in closer detail, e.g. to allow interaction or interlocking of the assemblies and individual parts.

The term phase boundary is used for boundaries between two or more media that have different dielectric constants and/or conductivities. Specifically, it concerns gas-liquid phase boundaries. However, the invention can also be applied to liquid-liquid and to gas-foam or foam-liquid phase boundaries.

The term module is used here to describe a functional group that is implemented in hardware, software or as a combination of hardware and software.

The term crosstalk is used herein to describe a form of electrical crosstalk in which a signal change, for example, a first signal (e.g. the output signal $s_{out1}(t)$) causes a signal change of a second signal for example (e.g. the output signal $s_{out2}(t)$). In general, the term crosstalk here stands for the unwanted one-sided or mutual influencing of signals of a device 100. In particular, it concerns the one-sided or mutual influencing of output signals of adjacent (circuit) channels the output signals of which are independent of each other without crosstalk.

Various devices are mentioned in connection with the present invention. They preferably concern laboratory devices, and other systems, installations, appliances, handling centers and the like, which are equipped with means for detecting a phase boundary. The device 100 according to the invention is an element or a component of such a device. For example, one device may include multiple identical devices 100 or multiple different devices 100.

The method according to the invention is preferably designed in all embodiments for detecting an air-liquid phase boundary by means of a sensor 3 (e.g. a sensor serving as a pipette) in a liquid container 5. In the following, reference will be made to the use of pipettes, wherein other (pipette) tips, needles, tubes and the like are also suitable as sensors 3 and can be used in the context of the invention in all embodiments.

In the following, reference will be made to the execution of a feed movement B. Such a feed movement B can describe a downward or an upward movement of the sensor 3 in the liquid container 5 in all embodiments.

For the purpose of detection, a pipette 3 is preferably used in all embodiments, which is advancable in the direction of the liquid 1 in the liquid container 5.

Basic aspects of the invention will be described in detail below with reference to specific embodiments.

Figure 2A:
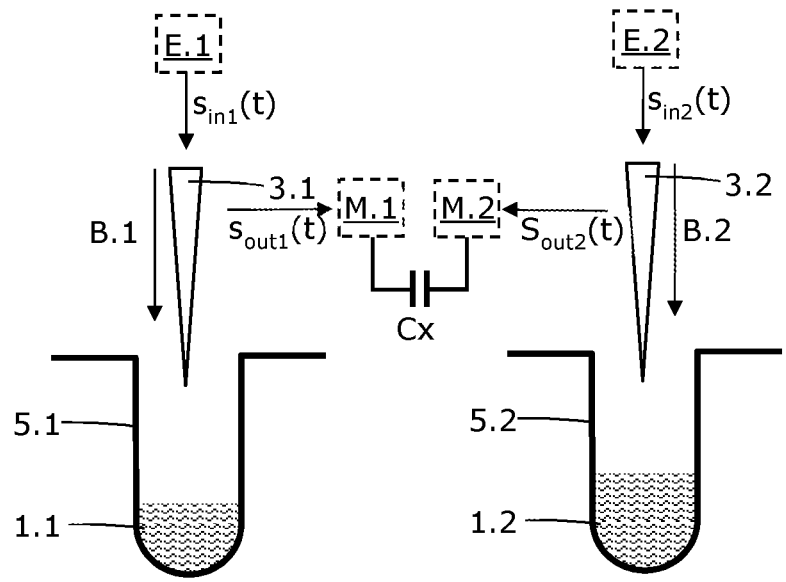
FIG. 2A shows a schematic illustration of a first multi-channel device (two adjacent channels are shown here) based on the known capacitively operating detection method of FIG. 1.
Figure 2B:
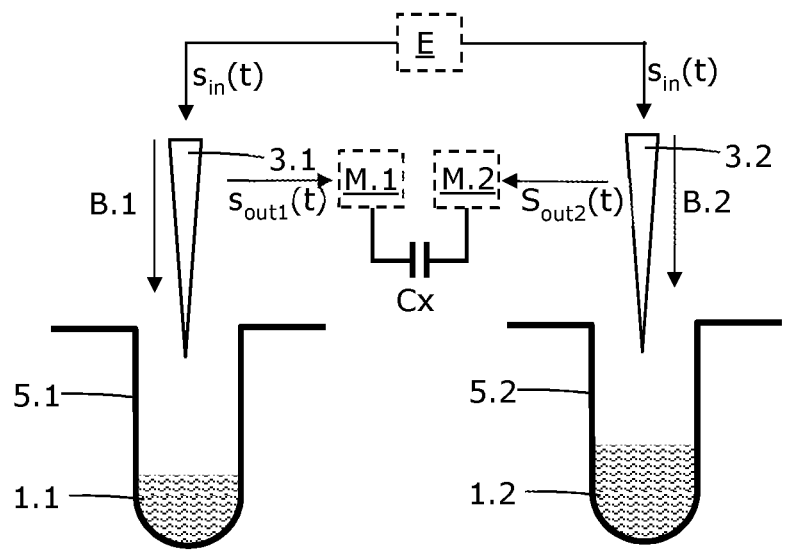
FIG. 2B shows a schematic illustration of a second multi-channel device (two adjacent channels are shown here) based on the known capacitively operating detection method of FIG. 1.
Figure 2C:
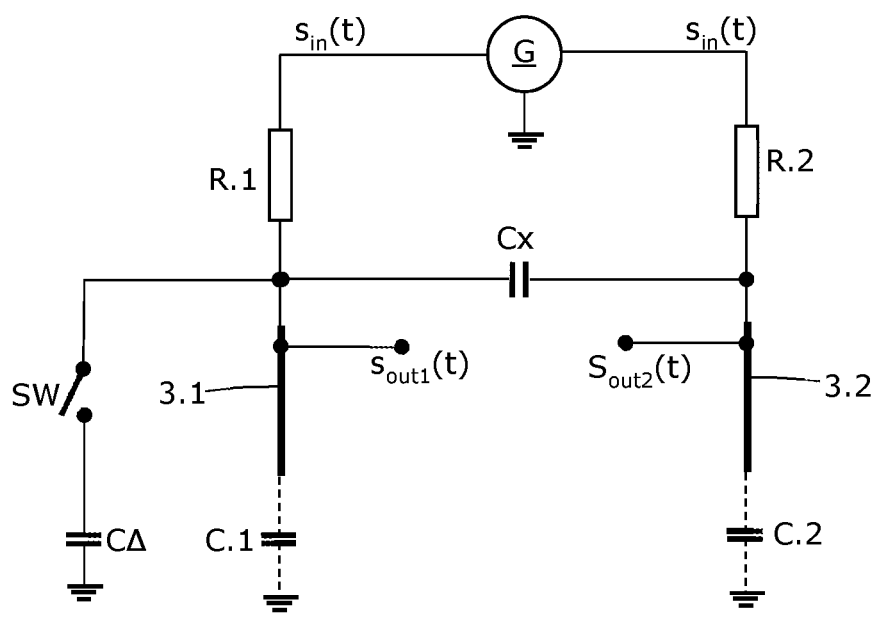
FIG. 2C shows a schematic equivalent circuit diagram of the device of FIG. 2B.
Figure 3:
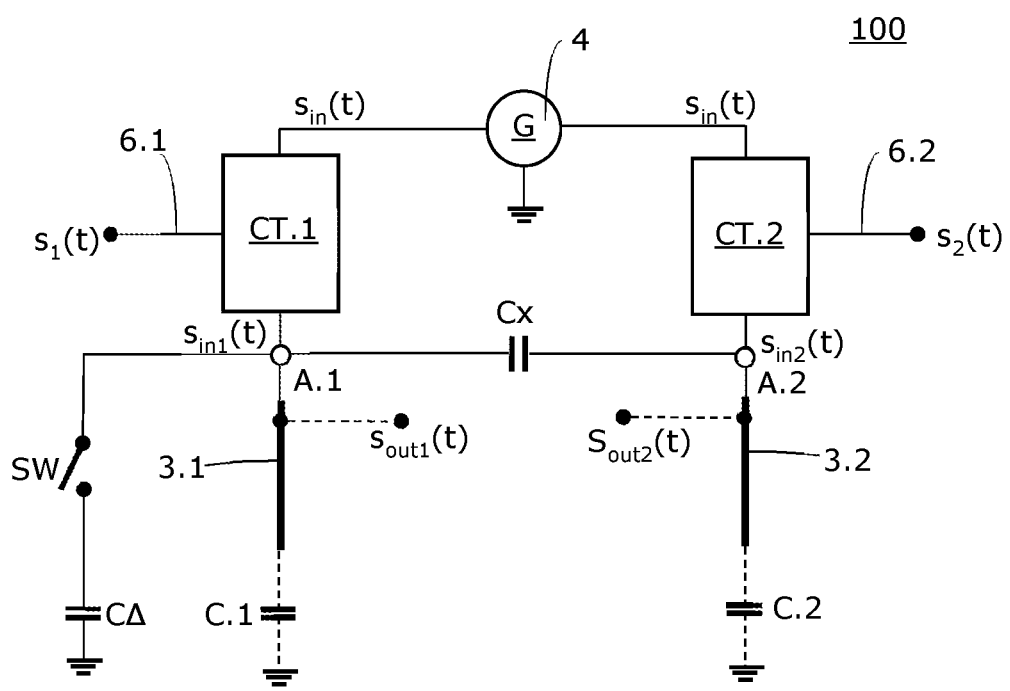
FIG. 3 shows a schematic equivalent circuit diagram of a first device according to the invention.

FIG. 3 shows a schematic circuit diagram of a first embodiment of a device 100 according to the present invention. This circuit diagram is based on the arrangement on the circuit diagram of FIG. 2C. In this respect, reference is also made to the description of FIGS. 2A to 2C.

FIG. 3 shows a schematic equivalent circuit diagram of a device 100 according to the invention. Here, an alternating voltage generator G serves as an input signal generator E, which feeds two adjacent channels with a common input signal $s_{in}(t)$. The alternating voltage generator G generates here, for example, a sinusoidal input signal $s_{in}(t)$, which reaches the first sensor 3.1 via a first compensation circuit CT.1 and the second sensor 3.2 via a second compensation circuit CT.2.

These sensors 3.1, 3.2 each have a capacitor C.1 or C.2 against mass in the highly schematic equivalent circuit. An output signal $s_{out1}(t)$ of the first channel can, as shown schematically, be tapped at the first sensor 3.1. An output signal $s_{out2}(t)$ of the second channel can be tapped accordingly at the second sensor 3.2. These two tap points for the output signals $s_{out1}(t)$ and $s_{out2}(t)$ are optional.

In FIG. 3—as already shown in FIG. 2C—a circuit branch is shown left of the first channel, having a switch SW and a capacitor CΔ. This circuit branch is intended to symbolize what happens when the first sensor 3.1 touches the liquid 1.1 in the container 5.1. At this moment, there will be a sudden change in the total capacitance (the total capacitance of the 3.1 sensor will increase). This is represented here by the connection of the parallel capacitor CΔ. The crosstalk already mentioned is also represented in FIG. 3 by the parasitic crosstalk capacitor Cx.

However, here the two compensation circuits CT.1 and CT.2 play a decisive role. Namely, these compensation circuits CT.1, CT.2 are designed to keep the first input signal $s_{in1}(t)$ and the second input signal $s_{in2}(t)$ synchronous and constant so as to prevent the occurrence of a voltage difference between the first sensor 3.1 and the second sensor 3.2.

Preferably, each of the two compensation circuits CT.1 and CT.2 comprises a control loop circuitry in all embodiments to keep the first input signal $s_{in1}(t)$ and the second input signal $s_{in2}(t)$ in synchronism and constant.

As shown in FIG. 3, outputs 6.1 and 6.2 are provided at the two compensation circuits CT.1 and CT.2. At these outputs, the output signals $s_1(t)$ and $s_2(t)$ are provided. Unlike in FIG. 2C, in connection with the detection of phase boundaries, the output signals $s_1(t)$ and $s_2(t)$ are used in place of the output signals $s_{out1}(t)$ and $s_{out2}(t)$ (e.g. by evaluation and/or further processing).

When immersing the probe 3.1 in the liquid 1.1 in the container 5.1, a capacitance jump is obtained, as already described. This capacitance jump is visible on the output signal $s_1(t)$ of the compensation circuit CT.1 after a brief settling. The output signal $s_2(t)$ of the compensation circuit CT.2, however, remains unchanged. Specifically, it only shows a short disturbance. The sine amplitude (if the generator G specifies a sine signal) of the output signal $s_2(t)$ does not change even if a phase boundary is detected at the adjacent channel.

The two compensation circuits CT.1 and CT.2 are designed in all embodiments and arranged in the feed branch of the sensors 3.1 and 3.2 such that the voltages $s_{in1}(t)$ and $s_{in2}(t)$ at the two sensors 3.1 and 3.2 do not change when connecting the parallel capacitor CΔ. Both voltages and signals $s_{out1}(t)$ and $s_{out2}(t)$ remain the same size. This ensures that there is no voltage difference at the crosstalk capacitor Cx. That is to say, no current flows through the crosstalk capacitor Cx. This is equivalent to the fact that no crosstalk between the two channels takes place.

In all embodiments, the compensation circuits CT.1 and CT.2 are preferably designed such that they actively regulate the first input signal $s_{in1}(t)$ and the second input signal $s_{in2}(t)$. That is to say, in concrete terms, the first input signal $s_{in1}(t)$ and the second input signal $s_{in2}(t)$ are tracked to the input signal $s_{in}(t)$, which has, for example, the form of a sine signal in this case.

Preferably, each of the two compensation circuits CT.1 and CT.2 comprises a control loop or a closed loop in all embodiments.

Figure 4:
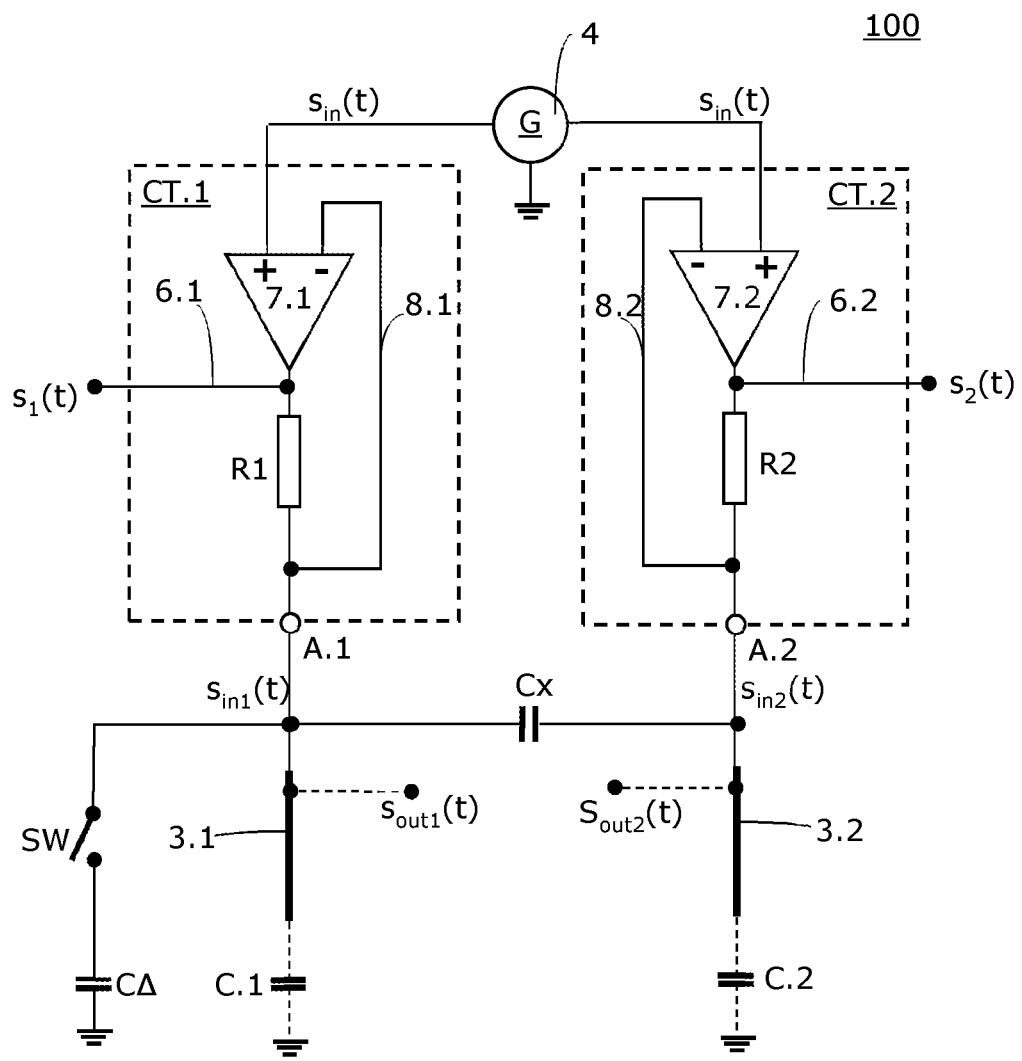
FIG. 4 shows a schematic equivalent circuit diagram of a second device according to the invention.

Referring now to FIG. 4, details of a preferred embodiment of the invention are shown. The circuit configuration is comparable to that of FIG. 3. In the following, therefore, only the essential differences are discussed. Otherwise, reference is made to the description of FIG. 3.

Each of the compensation circuits CT.1 and CT.2 can include the following elements or modules in all embodiments of the invention. On the input side sits an amplifier 7.1 or 7.2. One of the two amplifier inputs (denoted by "+") is fed with the sinusoidal signal $s_{in}(t)$. The respective other input of the amplifier 7.1 or 7.2 is connected to a return path 8.1 or 8.2. This return path 8.1 or 8.2 forms a feedback at the respective amplifier 7.1, 7.2. A respective resistor R1 or R2, as illustrated, sits on the output side of the amplifiers 7.1 or 7.2. The mentioned return paths 8.1 or 8.2 act after the respective resistance R1 or R2. They connect the output A.1 to the inverting input (denoted by "−") of the amplifier 7.1 and the output A.2 with the inverting input (denoted by "−") of the amplifier 7.2.

The corresponding outputs 6.1 or 6.2 are provided between the output of the amplifier 7.1 or 7.2 and the respective resistance R1 or R2. The input signal $s_{in}(t)$ is provided at the output A.1 and the input signal $s_{in2}(t)$ at the output A.2. These signals feed the respective sensor 3.1 or 3.2.

Preferably, in all embodiments so-called (operational) transconductance amplifiers are used as amplifiers 7.1 and 7.2. The reason for this is the following. If one uses normal operational amplifiers 7.1 and 7.2, as shown in FIG. 4, then these amplifiers 7.1, 7.2 are capacitively loaded at the respective inverting input due to the feedback (through the return paths of 8.1 or 8.2). This can lead to a shift of current and voltage, causing the compensation circuits CT.1 and CT.2 to become unstable.

A transconductance amplifier, on the other hand, has a high-impedance current output. Such transconductance amplifiers are therefore more suitable for driving or feeding a capacitive load (as is the case here).

Particularly suitable are transconductance amplifiers with differential input. This facilitates the realization of a negative feedback according to the circuit principle shown in FIG. 4. The transconductance amplifiers with differential input are referred to herein as differential or operational transconductance amplifiers (OTAs). Single-input amplifiers are designated simply as a transconductance amplifiers (TK). Compensation circuits CT.1 and CT.2 according to FIG. 4 are preferably used in all embodiments, with OTAs serving as amplifiers 7.1 and 7.2.

Instead of using OTAs, which are available as standard components, a discrete set-up can also be selected. In this case, each of the compensation circuits CT.1 and CT.2 comprises a differential stage with differential input which feeds a transconductance amplifier.

Figure 5:
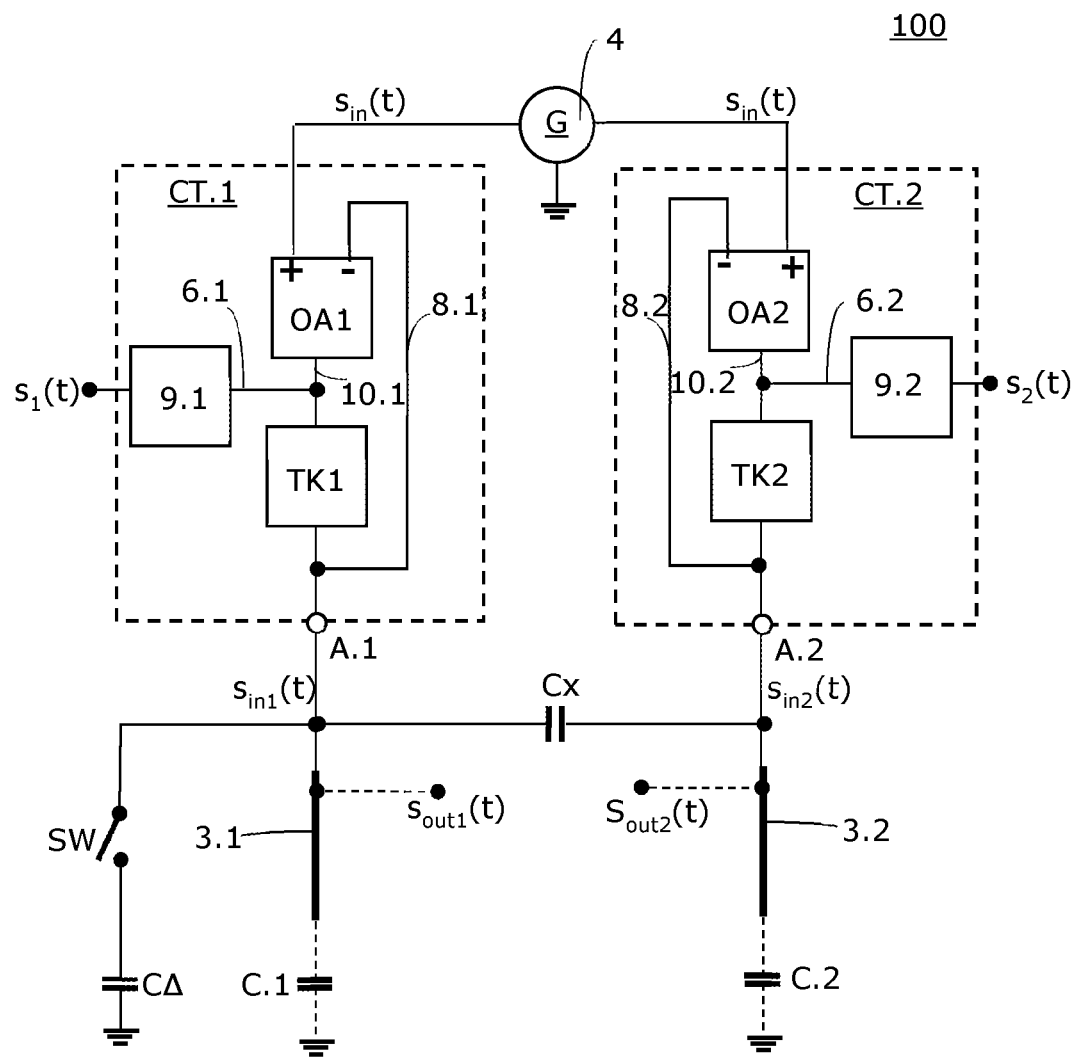
FIG. 5 shows a schematic equivalent circuit diagram of a third device according to the invention.

In FIG. 5, the equivalent circuit diagram of a corresponding device 100 of the invention is shown. The structure is in turn similar to the drawings already described. Reference is therefore made to the corresponding description. In the embodiment shown in FIG. 5, each compensation circuit CT.1 and CT.2 comprises on the input side an operational amplifier OA1 or OA2 with differential input (denoted by "+" and "−"). At the output 10.1 or 10.2 of the respective operational amplifier OA1 or OA2 sits a transconductance amplifier TK1 or TK2. In addition, at the respective output 10.1 or 10.2 a signal is tapped that is used for the actual detection of a phase boundary. The corresponding tapping points or lines are designated in FIG. 5 with 6.1 or 6.2.

Preferably, all embodiments of the invention, which comprise an operational amplifier OA1 or OA2 and a transconductance amplifier TK1 or TK2 per channel, comprise an output circuit 9.1 or 9.2, as shown in FIG. 5. These output circuits 9.1 or 9.2 are designed to prepare the signal which is tapped at the respective output 10.1 or 10.2. For this purpose, each of the output circuits 9.1 and 9.2 preferably comprises an amplifier followed by a demodulator. With appropriate design of the amplifier and the demodulator, the signals $s_1(t)$ and $s_2(t)$ can be read and processed with an analog-to-digital converter.

The feedback (realized by the return paths 8.1 or 8.2) engages in the embodiments of FIG. 5 at the output A.1 or A.2 of the transconductance amplifier TK1 or TK2 and connects this by circuitry to the inverting input (denoted by "−") of the operational amplifier OA1 or OA2.

Instead of using the transconductance amplifier TK1 or TK2, the compensation circuits CT.1 and CT.2 may also comprise voltage-controlled current sources which are constructed discretely or integrated from standard components.

To detect a phase boundary, the amplitude of the signals $s_1(t)$ and $s_2(t)$ is preferably evaluated in all embodiments. If a jump of the amplitude is detected, which is greater than a threshold value, then a successful detection of a phase boundary is to be assumed.

Preferably, all embodiments of the invention comprise a line with ground shield in order to connect the output A.1 or A.2 to the corresponding sensor 3.1, 3.2.

It is obvious that other types of voltage generators 4 that are known per se can be used for the method according to the invention. Thus, it is not absolutely necessary to produce sinusoidal alternating voltage components. Alternatively, in all embodiments, for example, an alternating voltage can be generated in the form of other periodic signals.

While the input signal $s_{in1}(t)$ or $s_{in2}(t)$ is applied by the compensation circuits CT.1 or CT.2 to the sensor 3.1 or 3.2, the output signal $s_1(t)$ of the first sensor 3.1 and the output signal $s_2(t)$ of the second sensor 3.2 is processed/evaluated by means of corresponding measuring devices M.1 or M.2 in order to detect a change in capacitance. For this purpose, the measuring devices M.1 or M.2 are connected downstream of the respective signal output.

In all embodiments of the invention, the evaluation of the output signal $s_1(t)$ or $s_2(t)$ can occur at the same time (quasi in real time) with the movement B of the sensor 3.1 or 3.2.

The invention is preferably applicable to multi-channel devices 100, even though only two channels are respectively shown and described.

LIST OF REFERENCE NUMERALS

Steps of feed movement B a), b), c)
First output A.1
Second output A.2
Feed movement B
First feed movement B.1
Second feed movement B.2
First capacitor C.1
Second capacitor C.2
First compensation circuit CT.1
Second compensation circuit CT.2
Crosstalk capacitor Cx
Connectable capacitor CΔ
Input signal generator E
First input signal generator E.1
Second input signal generator E.2
Alternating voltage generator G
Measuring device/setup M
First measuring device/setup M.1
Second measuring device/setup M.2
First resistor R.1
Second resistor R.2
First resistor R1
Second resistor R2
Switch SW
Output signal $s_{out}(t)$
First output signal $s_{out1}(t)$
Second output signal $s_{out2}(t)$
Input signal $s_{in}(t)$
First input signal $s_{in1}(t)$
Second input signal $s_{in2}(t)$
Liquid 1
First liquid 1.1
Second liquid 1.2
Sensor (pipette) 3
First sensor (pipette) 3.1
Second sensor (pipette) 3.2
Voltage generator 4
Liquid container 5

First liquid container 5.1
Second liquid container 5.2
First output 6.1
Second output 6.2
First amplifier 7.1
Second amplifier 7.2
First return path (feedback) 8.1
Second return path (feedback) 8.2
First output circuit 9.1
Second output circuit 9.2
First output 10.1
Second output 10.2
Device/laboratory appliance 100
Operational amplifier OA1, OA2
Transconductance amplifier TK1, TK2

The invention claimed is:

1. Method for use in a multichannel device (100) having a capacitively operating measuring apparatus (M), wherein the device (100) comprises, per channel, an advanceable sensor (3.1, 3.2) and a liquid container (5.1, 5.2), the method comprising the following steps:
   a) performing a feed movement (B.1) with a first one of the sensors (3.1);
   b) performing a feed movement (B.2) with a second one of the sensors (3.2);
   c) applying a first input signal ($s_{in1}(t)$) to the first sensor (3.1);
   d) applying a second input signal ($s_{in2}(t)$) to the second sensor (3.2);
   wherein the first input signal ($s_{in1}(t)$) and the second input signal ($s_{in2}(t)$) are kept synchronous and constant so as to prevent the occurrence of a voltage difference between the first sensor (3.1) and the second sensor (3.2), wherein a common periodic input signal (sin(t)) is applied to a plurality of channels of the multi-channel device (100), wherein in each channel of the multi-channel device (100), independently of the other channels of the multichannel device (100), a differential amplification followed by a transconductance amplification is performed to provide the input signals (sin1($t$), sin2($t$)) for the sensors (3.1, 3.2) of the corresponding channels.

2. Method according to claim 1, characterized in that a control loop circuitry is used to keep the first input signal ($s_{in1}(t)$) and the second input signal ($s_{in2}(t)$) synchronous and constant.

3. Method according to claim 1, characterized in that for each channel of the multi-channel device (100), a feedback of the input signal ($s_{in1}(t)$, $s_{in2}(t)$) of the respective channel is made to an input of a compensation circuit (CT.1, CT.2).

4. Method according to claim 1, characterized in that on each channel of the multi-channel device (100) a signaling feedback (8.1, 8.2) is made.

5. Device (100) having a plurality of capacitively operating channels, wherein the device (100) comprises, per channel, an advanceable sensor (3.1, 3.2) and a fluid container (5.1, 5.2), characterized in that the device (100) comprises:
   a generator (G; 4) for providing a periodic input signal ($s_{in}(t)$), per channel
   a compensation circuit (CT.1, CT.2) comprising an operational amplifier (OA1, OA2) with an inverting and a non-inverting input, wherein the non-inverting input of the operational amplifier (OA1, OA2) can be fed with the periodic input signal ($s_{in}(t)$), and
   wherein the operational amplifier (OA1, OA2) comprises an output (10.1, 10.2) which is connectable to a transconductance amplifier (TK1, TK2), wherein the transconductance amplifier (TK1, TK2) has a first output (A.1, A.2) to provide an input signal ($s_{in1}(t)$, $s_{in2}(t)$) for the sensor (3.1, 3.2) of the corresponding channel and a second output (6.1, 6.2) to provide the signal ($s_1(t)$, $s_2(t)$) that can be evaluated to detect a phase boundary.

6. Device (100) according to claim 5, characterized in that it comprises per channel an output circuit (9.1, 9.2) with an amplifier followed by a demodulator to provide the signal ($s_1(t)$, $s_2(t)$) that can be evaluated to detect a phase boundary.

7. Device (100) according to claim 5, characterized in that the compensation circuit (CT.1, CT.2) comprises a voltage-controlled current source.

* * * * *